(12) United States Patent  (10) Patent No.: US 8,564,672 B2
Law et al.  (45) Date of Patent: Oct. 22, 2013

(54) METHODS AND SYSTEMS FOR SELECTING IMAGE CAPTURING DEVICES

(75) Inventors: Boon Kiat Law, Singapore (SG); Tapas Kumar Das, Singapore (SG); Kar Vui Chin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 12/476,777

(22) Filed: Jun. 2, 2009

(65) Prior Publication Data

US 2010/0302380 A1  Dec. 2, 2010

(51) Int. Cl.
*H04N 5/225* (2006.01)
*H04N 5/232* (2006.01)

(52) U.S. Cl.
USPC ............... 348/207.11; 348/211.6; 348/211.11

(58) Field of Classification Search
USPC .................. 348/207.1, 207.11, 211.4, 211.6, 348/211.11
See application file for complete search history.

(56) References Cited

U.S. PATENT DOCUMENTS

| | | | | |
|---|---|---|---|---|
| 2003/0081851 A1* | 5/2003 | Sadeh | ........................... | 382/250 |
| 2006/0099992 A1* | 5/2006 | Ju | ............................... | 455/558 |
| 2007/0142084 A1* | 6/2007 | Van Niekerk et al. | ........ | 455/557 |
| 2008/0081569 A1* | 4/2008 | Shiono | ............................ | 455/95 |
| 2010/0115084 A1* | 5/2010 | Caspi et al. | .................... | 709/224 |

OTHER PUBLICATIONS

Sensible Vision, FastAccess OEM, Retrieved Sep. 15, 2010 from www.sensiblevision.com.

* cited by examiner

*Primary Examiner* — Daniel M Pasiewicz
(74) *Attorney, Agent, or Firm* — Baker Botts L.L.P.

(57) ABSTRACT

A method of selecting an image capturing device in communication with an information handling system (IHS) is disclosed wherein the method includes executing an imaging software application and loading first data corresponding to an image capturing device compatible with the imaging software application, wherein the image capturing device is in communication with the IHS. The method further includes automatically executing a compatible image capturing device corresponding to the imaging software application. An information handling system (IHS) is further disclosed including a storage medium operable to store an imaging software application. The system further includes memory coupled to a processor, wherein the processor is configured to execute the imaging software application. The system may further include a virtual driver installed on the storage medium, the virtual driver configured to automatically select a preferred image capturing device corresponding to the imaging software application and wherein the preferred image capturing device is in communication with the IHS.

14 Claims, 4 Drawing Sheets

METHODS AND SYSTEMS FOR SELECTING IMAGE CAPTURING DEVICES

TECHNICAL FIELD

The present disclosure relates generally to the field of information handling systems, and more specifically, to methods and systems for supporting image capturing devices coupled to information handling systems.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Image capturing devices, such as cameras, webcams, or the like, are capable of communicating with information handling systems (IHSs). As an example, an IHS may be shipped with multiple image capturing devices (e.g., television (TV) tuner and webcam) whereby the IHS is preloaded with a multitude of drivers corresponding to the image capturing devices. In the case where an IHS is associated with multiple image capturing devices, the devices may exhibit similar functionalities and may be categorized together, as detected by an operating system (OS) of the IHS. Therefore, an OS may not be able to differentiate among the various types of image capturing devices in communication with the IHS.

Typically, a user may launch an imaging software application requiring the execution of an image capturing device. Under current practice, the user manually selects an appropriate image capturing device corresponding to the imaging software application executed. To this end, an imaging software application may provide a dropdown menu for a user to select a preferred image capturing device from a list of various possible devices, typically arranged in alphabetical order. A preferred image capturing device may be manually selected by the user. However, in some instances, the device selected may not be the most compatible device for the imaging software application. An imaging software application may further select one of the available image capturing devices as a default selection. However, the selected device may not be desired by the user or may not be compatible with the imaging software application.

Thus, a need exists for systems and methods to automatically (i.e., without user intervention) recognize and match imaging software applications to their appropriate image capturing devices required for execution. Such systems and methods may involve a virtual driver to recognize and/or select a preferred image capturing device corresponding to an executed imaging software application.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method of selecting an image capturing device in communication with an information handling system (IHS) wherein the method includes executing an imaging software application and loading first data corresponding to an image capturing device compatible with the imaging software application, wherein the image capturing device is in communication with the HIS. The method further includes automatically selecting a preferred image capturing device based on the first data.

Another aspect of the disclosure provides for a method of selecting an image capturing device in communication with an information handling system (IHS) wherein the method includes executing an imaging software application and executing a virtual driver, wherein the virtual driver is preloaded on the IHS. The method further includes loading first data corresponding to an image capturing device compatible with the imaging software application, wherein the image capturing device is in communication with the IHS. The method further includes accessing the virtual driver to automatically select a preferred image capturing device based on the first data.

Yet another aspect of the disclosure provides for an information handling system (IHS) including a storage medium operable to store an imaging software application. The system also includes memory coupled to a processor, wherein the processor is configured to execute the imaging software application. The system may further include a virtual driver installed on the storage medium, the virtual driver configured to automatically select a preferred image capturing device corresponding to the imaging software application and wherein the preferred image capturing device is in communication with the IHS.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
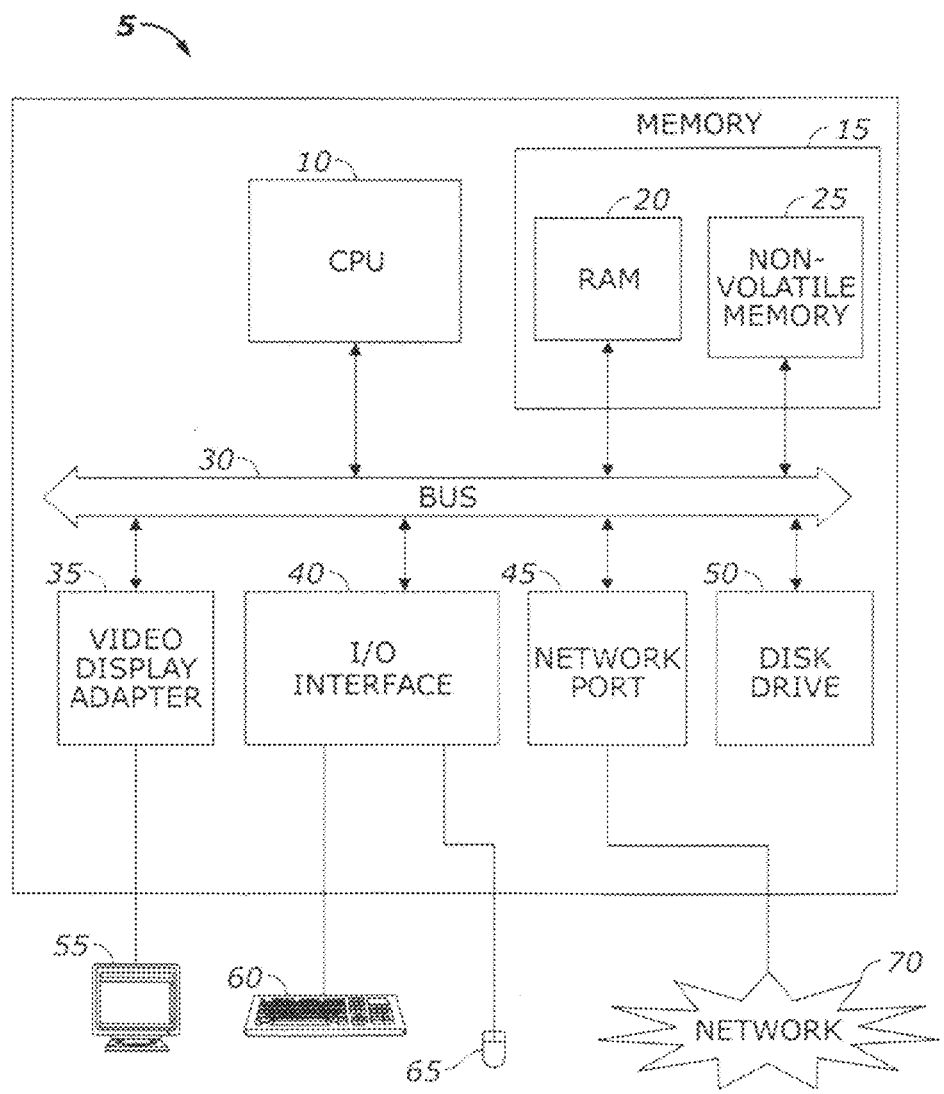
FIG. 1 represents an information handling system (IHS) in accordance with one aspect of the present disclosure.

Before the present systems and methods are described, it is to be understood that this disclosure is not limited to the particular systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "an image" refers to one or several images and reference to "a method of matching" includes reference to equivalent steps and methods known to those skilled in the art, and so forth.

For purposes of this disclosure, an implementation of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Coupled to an IHS may be one or more image capturing devices which may require the execution of compatible imaging software application(s). The present disclosure describes methods and systems for automatically matching an executed imaging software application with its respective image capturing device(s), particularly without user intervention. The present disclosure further discloses methods and systems for automatically selecting a preferred image capturing device upon the execution of an imaging software application.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

In implementations of the present disclosure, a network 70 may provide an information infrastructure, including physical connections or couplings, to allow more than one IHS to communicate with each other and share information. A network 70 may also communicatively couple components of one or more IHSs to one another. In addition to the aforementioned, the network 70 may be implemented as, or may be part of, a personal area network (PAN), metropolitan area network (MAN), wireless local area network (WLAN), virtual private network (VPN), an intranet, or any other appropriate architecture or system that facilitates the communication of signals, data, and/or messages.

Figure 2:
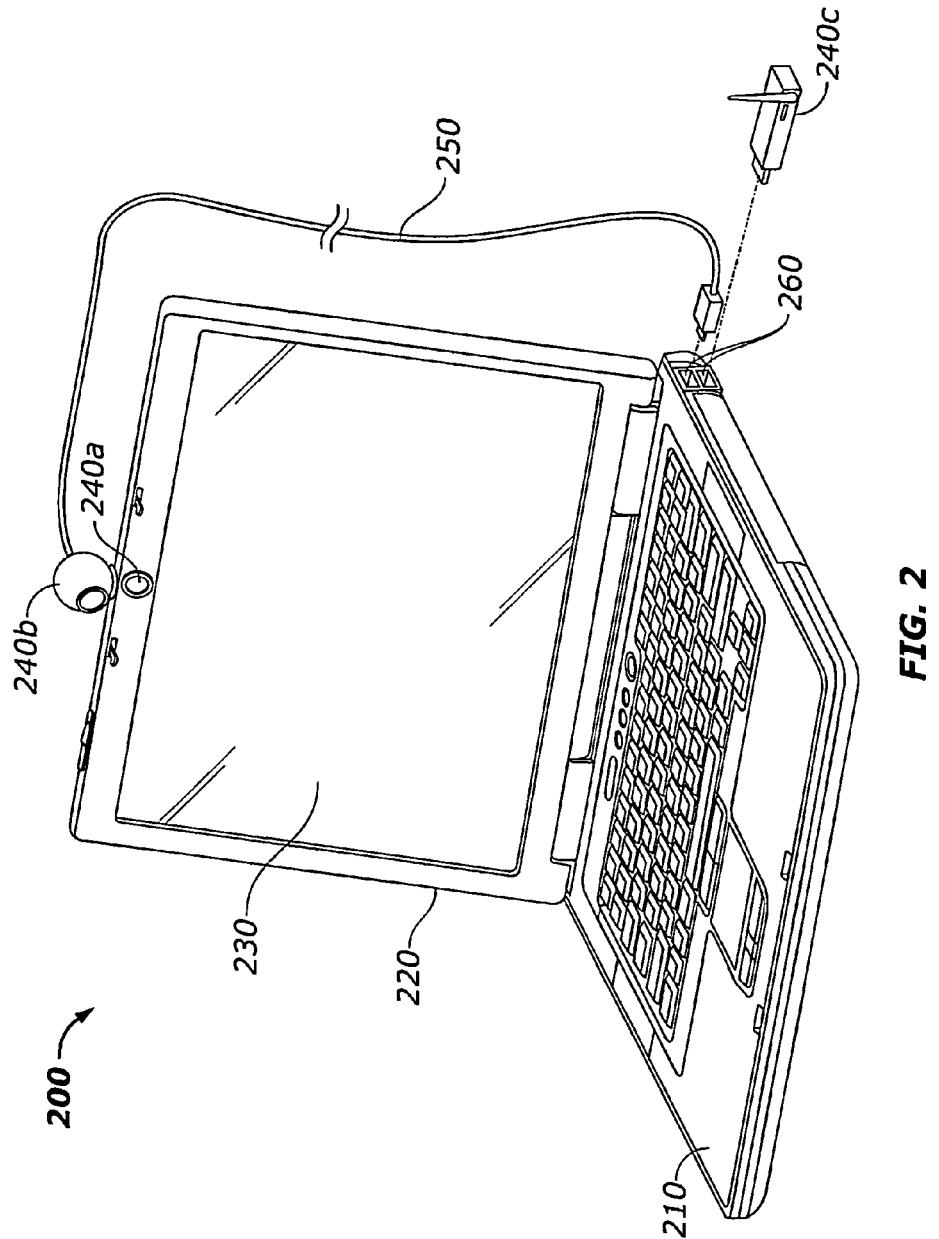
FIG. 2 represents a portable IHS in communication with image capturing devices in accordance with aspects of the present disclosure.

Turning now to FIG. 2, a schematic is provided illustrating a portable information handling system (IHS), indicated generally at 200, as one possible implementation of an IHS. The portable IHS 200 may include a base 210 and a panel 220 with a display 230 disposed thereon. The base 210 may house several components of the portable IHS 200, including, but not limited to, a motherboard, CPU, memory, any of the above-mentioned components or components that may be present in a typical IHS. Although a portable IHS 200 is shown, the present disclosure has application to IHSs of varying forms such as a desktop, server, or the like.

As shown, an image capturing device 240a-c may be coupled to the portable IHS 200. Examples of image capturing devices may include, but are not limited to, recording devices (e.g., camcorders), cameras (e.g., integrated cameras, webcams, video cameras, or videoconferencing cameras), television (TV) tuner, or any suitable electronic device operable to generate, capture and/or record an image for viewing by a user. Typically, an image capturing device may capture an image utilizing a medium, such as a film, device component such as a charge coupled device (CCD), circuit sensor (e.g., complementary metal-oxide-semiconductor (CMOS) sensor), or the like, and transfer the image to a storage medium within the image capturing device for playback or processing. Examples of storage media within the image capturing device may include tape or memory, as just a few examples.

As shown in FIG. 2, an image capturing device 240a-c may take the form of an integrated camera 240a disposed within the panel 220 of the portable IHS 200. Thus, the integrated camera 240a may be configured to capture image data through an opening in the panel 220. Such integrated camera 240a may operate as any conventional camera as is known in the art. For example, the integrated camera 240*a* may correspond to a conventional digital camera such as a point and click camera.

In accordance with another aspect of the disclosure, an image capturing device 240*a-c* may be a webcam 240*b* coupled to the portable IHS 200 via a connection cable 250. The webcam 240*b* may be an example of a conventional video capturing device whose output is primarily available for viewing over a network (e.g. Internet). Generally, the webcam 240*b* may be coupled to the portable IHS 200 or a network by way of any suitable connection such universal serial bus (USB), ethernet, Wi-Fi, or the like.

In yet another aspect, an image capturing device 240*a-c* may be a television (TV) tuner 240*c*, i.e., TV tuner card, allowing TV signals to be received by the portable IHS 200. A TV tuner 240*c* may also serve as a video capture card, allowing the recording of television programs onto a storage medium (e.g., hard disk). The TV tuner, shown in FIG. 2 coupled to the portable IHS 200 via a serial communication (e.g., USB) port 260, may be provided in various interfaces including, but not limited to, peripheral component interconnect (PCI) bus, PCI Express (PCIe) bus, Mini PCIe, personal computer memory card international association (PCMCIA), PCMCIA Express, or USB.

A device driver may be any component utilized by an operating system (OS) to interact with a hardware device including any image capturing device such as a camera, or the like. Rather than accessing the image capturing device directly, an OS may load the device driver and call functions in the device driver to carry out actions on the particular hardware device. Each device driver exports a set of functions which contains the device-specific code needed to carry out actions on the device. To that end, a device driver creates a device object (DO) for each device it controls whereby the DO represents the device to the device driver.

The imaging software application disclosed herein may be one example of a collaborative software designed to integrate individuals with tasks. Other examples of collaborative software may include, but are not limited to, electronic mail (i.e., email) and calendaring. An imaging software application may include an additional facet of supporting an image capturing device in communication with the application or being able to generate an image for viewing by a user. To this end, the imaging software application performs compression of audio and/or visual data streams, which may be transmitted through a digital network to output devices (e.g., display, speakers) of the IHS. Further, an imaging software application may be stored on a storage medium, such as a local hard drive, network drive, or the like, coupled to an IHS. The processor of the IHS may execute the imaging software application upon the selecting and/or launching of the application by a user. Examples of imaging software applications include, but are not limited to, videochat, videoconference and videophone.

The present disclosure further contemplates the use of a virtual driver (VD) to automatically select a compatible image capturing device coupled to an IHS for an imaging software application executed on the IHS. The VD, stored on a storage medium (e.g., hard drive, network drive) coupled to the IHS, may comprise a single or multiple algorithms to map an imaging software application necessary to operate a particular image capturing device in communication with the IHS. Further, a preferred image capturing device may be automatically selected based on user specified parameters within an algorithm, as described below.

The VD may load a device list of all available image capturing devices along with their corresponding device driver(s). In one implementation, the VD may load a positive device list that maps each imaging software application to one or more compatible image capturing device, in order of default or user-defined preference. In one implementation, for each IHS, a user (e.g., administrator, engineer) may define the positive device list manually based on his/her own knowledge or preference. As a first preference, VD may utilize the positive device list to select an image capturing device to utilize if the device is readily available. For example, if a user executes a videoconferencing application as an imaging software application, VD may look up the positive device list to find a video camera, i.e., Webcam, as the preferred device over another compatible image capturing device such as TV tuner, for example. As another example of an imaging software application, video playback may be mapped to a camcorder and as such, the VD may look up the positive device list and map the application to the camcorder.

If more than one compatible image capturing device is available, an algorithm of the VD may be executed to apply a filter and connect with a single preferred image capturing device based on a parameter (e.g., alphabetical listing, most recent version of image capturing device). By way of example, should a user select alphabetical order as a parameter of the filter, the VD may select and connect with the first device on an alphabetical list of compatible image capturing devices in determining the preferred image capturing device.

In another implementation of a device list, the VD may load a negative device list that maps each imaging software application to image capturing devices that should not be utilized for the application, even if readily available. In one implementation, for each IHS, a user (e.g., administrator, engineer) may define the negative device list manually based on his/her own knowledge or preference. As a second preference following the positive device list, the VD may look up the available image capturing devices and utilize the negative device list as a filter. For example, if a user executes a video conferencing application as an imaging software application, VD may look up the negative device list and filter out the TV tuner, which may be deemed non-compatible with the video conferencing application.

Figure 3:
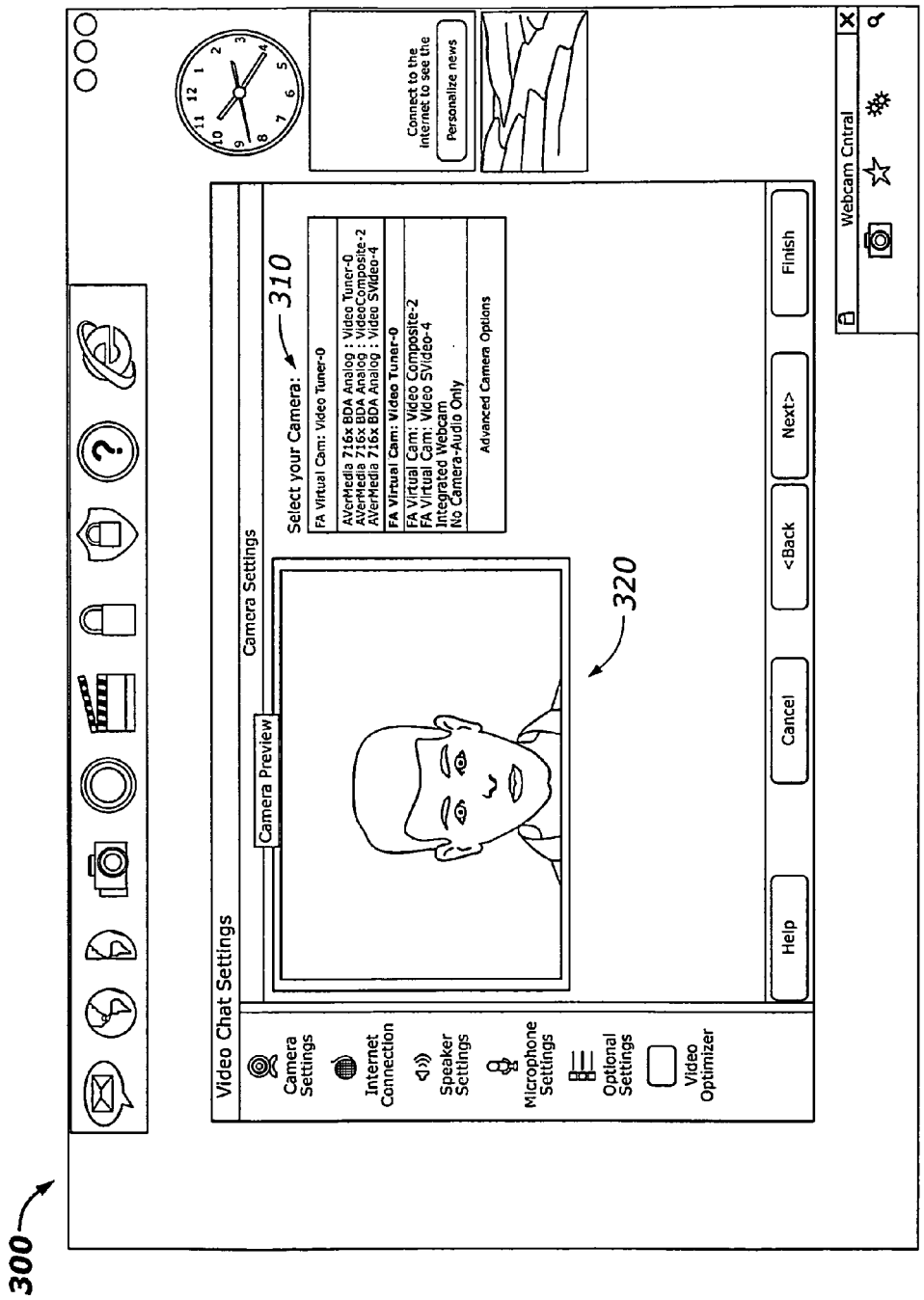
FIG. 3 provides a graphical user interface (GUI) for selecting an image capturing device in accordance with one aspect of the present disclosure.

Referring now to FIG. 3, a graphical user interface (GUI) 300 is provided for selecting an image capturing device, as seen in the prior art. Upon executing an imaging software application, a user may manually select a corresponding preferred image capturing device from a device dropdown menu 310. As shown, the device dropdown menu 310 may include a list of all possible image capturing devices to be coupled to the IHS. Upon selecting and/or initializing a preferred image capturing device, an image may be generated on the preview screen 320 for viewing by a user. However, as stated previously, the manual selection by a user of an image capturing device may not produce a selection which is most compatible with an imaging software application executed. Thus, the method discussed below may provide a means by which a preferred image capturing application is automatically selected upon the execution of its corresponding imaging software application.

While FIG. 3 and the accompanying disclosure has been described within the context of a camera for purposes of illustration, the GUI shown may have applicability to selecting a wide variety of image capturing device such as, for instance, a videocam, TV tuner, or the like. It should also be understood that any GUI for selecting an image capturing device as found in the prior art may not include elements (e.g., settings, toolbar, icons, etc.) shown or may include more elements shown in FIG. 3.

Figure 4:
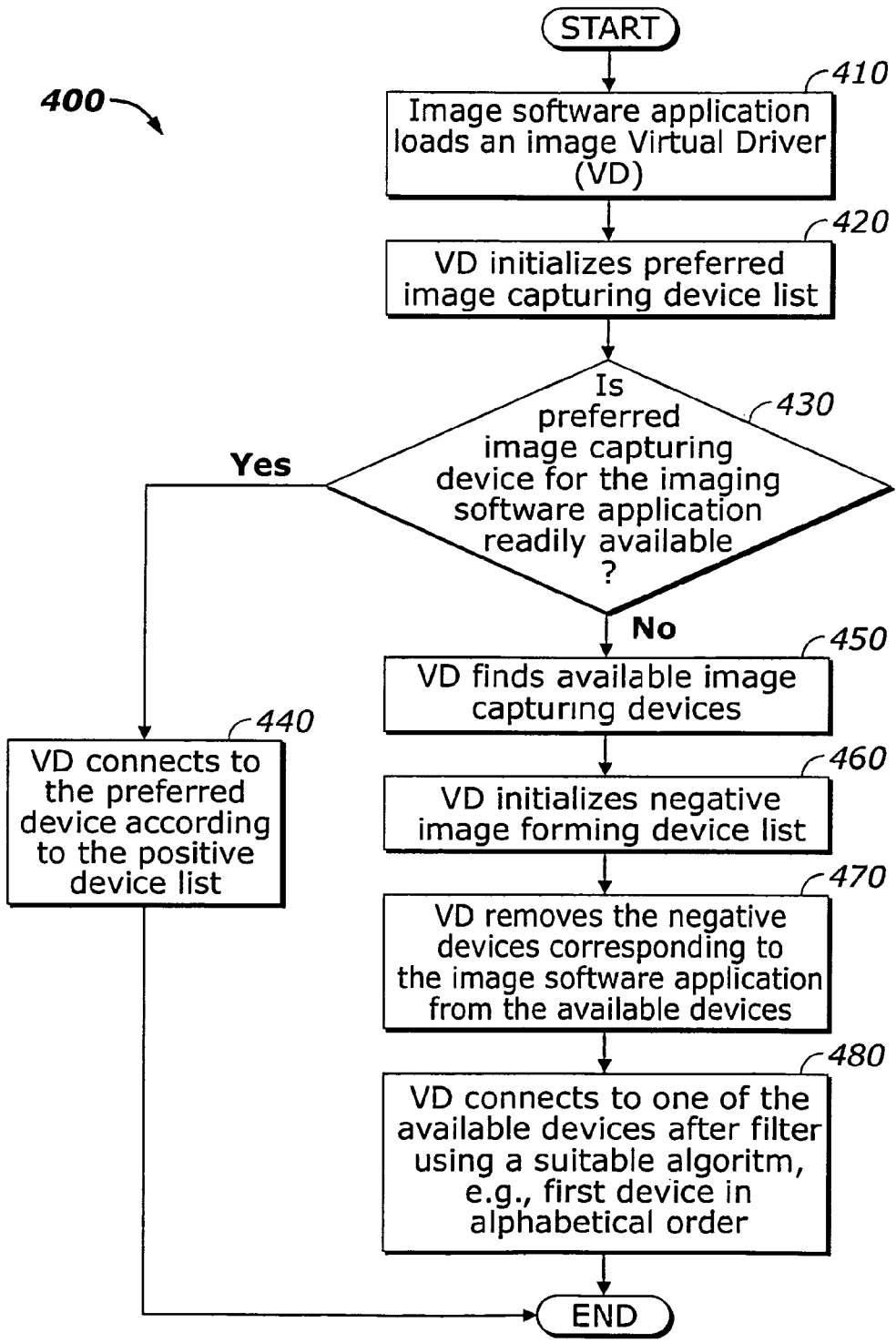
FIG. 4 provides a flow diagram of a method for selecting an image capturing device coupled to an IHS in accordance with one aspect of the present disclosure.

Turning now to FIG. 4, a flow diagram is provided of a method 400 for selecting an image capturing device in communication with an IHS. The IHS may first be powered on and an imaging software application may be executed or launched by a user. In step 410 an imaging software application executes or loads an image virtual driver (VD). When an imaging software application is executed on the IHS, the application may connect with the VD which is pre-installed or pre-loaded on the IHS. As such, the VD may be installed and stored on a storage medium (e.g., hard drive) of the IHS during the system manufacturing process or prior to the first boot-up of the IHS by a user.

The VD then loads a positive device list in step 420. The positive device list may be a type of data corresponding to the mapping of each imaging software application with their corresponding compatible image capturing devices. For example, an imaging software application may be mapped to one or more compatible image capturing devices such as a webcam, or an integrated camera, and such mapping data may be accumulated within a positive device list. As used herein, an image capturing device may be compatible, i.e., functional, with a corresponding imaging software application In step 430, it is determined whether the compatible image capturing device(s) for the imaging software application is/are available. In other words, a VD algorithm may determine if any of the compatible image capturing devices is currently coupled to the IHS. In the case where multiple imaging software applications are executed at one time, a subsequently executed imaging software application may determine if a compatible image capturing device is in use by a previously executed imaging software application. In the event that a particular compatible image capturing device is available, the device may be considered a preferred image capturing device and as such, it may communicatively couple to the VD in step 440. To that end, a device driver compatible with the preferred image capturing device is loaded into the operating system (OS) of the IHS.

In the case where a preferred image capturing device is not available, i.e., not coupled to the IHS, is currently in use or is occupied by an imaging software application, the VD may search for any other available image capturing device(s) not on the positive device list corresponding to the imaging software application in step 450. For example, if an executed imaging software application cannot locate any compatible image capturing devices according to its positive device list, the application may search for any available image capturing device coupled to the IHS.

Continuing further with the method 400 in FIG. 4, the VD initializes a negative device list in step 460. As previously mentioned, the negative device list may be a type of data corresponding to an image capturing device not compatible with a given imaging software application. In one implementation, the negative device list may include data comprising combinations (e.g., mapping data) of imaging software applications and image capturing devices not included in the positive device list.

In step 470, the VD may filter one or multiple devices from the available image capturing devices not included on the positive device list corresponding to a particular imaging software application. For example, a webcam may be coupled to an IHS and may be automatically initialized after execution of a videoconference application. The VD may then eliminate the choice of any image capturing device not compatible with the videoconference application from the positive device list. Therefore, when the videoconference application is executed during subsequent usage, the VD will automatically search for and launch the webcam. Devices not compatible with the videoconference application, such as TV tuner, for example, will not be initialized or asked to be initialized upon future execution of the videoconference application.

Further, in step 480, the VD may utilize an algorithm to filter through the list of compatible image capturing devices in the positive device list and subsequently, automatically select a preferred image capturing device based on the data from the positive device list. In another implementation, a preferred image capturing device may be automatically selected based on both the positive device list and the negative device list. For example, the algorithm may select the first available image capturing device from an alphabetical listing of the available devices, if a user should designate the selection of the first device of an alphabetical listing of compatible image capturing devices. As another example, the algorithm may select the latest version of a compatible image capturing device from a positive device list listed chronologically by version of the device. The algorithm may filter the compatible image capturing devices based on any suitable parameter (e.g., size of the device executable file, version number) and connect with preferred image capturing device based on the parameter. Thus, the execution of an imaging software application may automatically execute a preferred (i.e., available and compatible device) image capturing device corresponding to the executed imaging software application.

The automatic selection of a preferred image capturing device response to the execution of the imaging software application may occur without user intervention or manual selection by a user. Thus, automatic selection of a preferred image capturing device may entail the initialization of the preferred image upon execution of an imaging software application. Further, the preferred image capturing device may be selected from a plurality of compatible image capturing devices recognized by the IHS based on a user determined algorithm or availability of the compatible image capturing devices. To that end, the IHS may access the VD via an algorithm to automatically identify a compatible image capturing device. For example, in the event that execution of a videoconference application generates a positive device list including a webcam and integrated camera, the webcam may automatically be executed if the integrated camera is not currently coupled to the IHS. In another scenario, a user may designate that an image capturing device be selected based on an alphabetical listing of all compatible image capturing devices corresponding to a particular imaging software application. As an example, execution of the videoconference application may cause the integrated camera, rather than the webcam, to be automatically executed based on an alphabetical algorithm set by the user.

Moreover, the automatic execution of a preferred image capturing device may necessitate the installation and/or execution of a driver corresponding to the preferred image capturing device. In particular, during the first execution of an image capturing device, the driver corresponding to the device may to be installed on the IHS. The driver corresponding to a preferred image capturing device may be stored on any suitable storage medium such as a local hard drive, network drive, or the like.

Thus, methods and systems disclosed herein may relate to automatically selecting a preferred image capturing device based on the execution of its corresponding imaging software application. The automatic selection of such preferred image capturing device may prevent error(s) in matching an incorrect or in-compatible image capturing device to an executed imaging software application, as would occur during a user's manual selection of a device. Methods disclosed herein may have applicability to either integrated (e.g., built-in) or after point of sale image capturing device(s), particularly when an IHS does not include an integrated image capturing device (e.g., detachable webcam or TV tuner).

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method of selecting an image capturing device in communication with an information handling system (IHS), the method comprising:
   executing an imaging software application;
   loading a positive device list, the positive device list comprising a list of image capturing devices compatible with the imaging software application;
   loading a negative device list, the negative device list comprising a list of image capturing devices not compatible with the imaging software application;
   determining whether an image capturing device on the positive device list is available; and
   if at least one image capturing device on the positive device list is available, automatically selecting a preferred image capturing device based on the positive device list; and
   if no image capturing device on the positive device list is available, automatically selecting an alternative image capturing device that is available and absent from the negative device list.

2. The method of claim 1 further comprising:
   installing a driver on the IHS, the driver associated with the preferred image capturing device.

3. The method of claim 1, wherein executing the imaging software application is performed by a virtual driver pre-loaded on the IHS.

4. The method of claim 1 further comprising loading a device driver compatible with the preferred image capturing device into the operating system (OS) of the IHS.

5. A method of selecting an image capturing device in communication with an information handling system (IHS), the method comprising:
   executing an imaging software application;
   executing a virtual driver, wherein the virtual driver is pre-loaded on the IHS;
   loading a positive device list, the positive device list comprising a list of image capturing devices compatible with the imaging software application;
   loading a negative device list, the negative device list comprising a list of image capturing devices not compatible with the imaging software application;
   determining whether an image capturing device on the positive device list is available; and
   if at least one image capturing device on the positive device list is available, accessing the virtual driver to automatically select a preferred image capturing device based on the positive device list; and
   if no image capturing device on the positive device is available, accessing the virtual driver to automatically select an alternative image capturing device that is available and absent from the negative device list.

6. The method of claim 5 further comprising:
   installing a driver on the IHS, the driver associated with the preferred image capturing device.

7. The method of claim 5, wherein the virtual driver further automatically selects a preferred image capturing device based on availability of a plurality of compatible capturing devices.

8. The method of claim 5 further comprising loading a device driver compatible with the preferred image capturing device into the operating system (OS) of the IHS.

9. An information handling system (IHS) comprising:
   a storage medium operable to store an imaging software application;
   memory coupled to a processor, wherein the processor is configured to execute the imaging software application; and
   a virtual driver installed on the storage medium, wherein the virtual driver loads a positive device list, the positive device list comprising a list of image capturing devices compatible with the imaging software application and loads a negative device list, the negative device list comprising a list of image capturing devices not compatible with the imaging software application, the virtual driver configured to automatically select a preferred image capturing device corresponding to the imaging software application based on the positive device list if at least one image capturing device on the positive device list is available, and to automatically select an alternative image capturing device that is available and absent from the negative device list if no image capturing device on the positive device list is available.

10. The system of claim 9, wherein the preferred image capturing device is an integrated camera.

11. The system of claim 9, wherein the preferred image capturing device is a camera external to the IHS.

12. The system of claim 9, wherein the preferred image capturing devices is a television (TV) tuner.

13. The system of claim 9, wherein the imaging software application is a videoconference application.

14. The system of claim 9, wherein the virtual driver is configured to automatically select a preferred image capturing device based on availability of a plurality of compatible capturing devices.

* * * * *